United States Patent
Poveda Lerma et al.

(10) Patent No.: US 11,283,346 B2
(45) Date of Patent: Mar. 22, 2022

(54) SYSTEM AND METHOD FOR DYNAMIC OVER-CURRENT PROTECTION FOR POWER CONVERTERS

(71) Applicant: Power Electronics España, S.L., Paterna (ES)

(72) Inventors: Antonio Poveda Lerma, Paterna (ES); Abelardo Salvo Lillo, Paterna (ES); David Salvo Lillo, Paterna (ES)

(73) Assignee: Power Electronics España, S.L., Paterna (ES)

( * ) Notice: Subject to any disclaimer, the term of this patent is extended or adjusted under 35 U.S.C. 154(b) by 0 days.

(21) Appl. No.: 16/956,119

(22) PCT Filed: Dec. 4, 2018

(86) PCT No.: PCT/ES2018/070778
§ 371 (c)(1),
(2) Date: Jun. 19, 2020

(87) PCT Pub. No.: WO2019/122469
PCT Pub. Date: Jun. 27, 2019

(65) Prior Publication Data
US 2020/0328670 A1    Oct. 15, 2020

(30) Foreign Application Priority Data

Dec. 20, 2017    (ES) ............... ES201731435

(51) Int. Cl.
*H02M 1/32*       (2007.01)
*H02M 3/158*      (2006.01)

(52) U.S. Cl.
CPC ............. *H02M 1/32* (2013.01); *H02M 3/158* (2013.01)

(58) Field of Classification Search
CPC ....... H02M 3/156; H02M 3/3158; H02M 1/32
See application file for complete search history.

(56) References Cited

U.S. PATENT DOCUMENTS

| 4,415,960 A | 11/1983 | Clark, Jr. |
| 2012/0020118 A1 | 1/2012 | Takaki |

(Continued)

FOREIGN PATENT DOCUMENTS

| EP | 2800260 A1 | 12/2012 |
| EP | 2779391 A1 | 9/2014 |

(Continued)

*Primary Examiner* — Rafael O De Leon Domenech
(74) *Attorney, Agent, or Firm* — The Webb Law Firm

(57) ABSTRACT

The invention discloses a system and a method for dynamic over-current protection for power converters. The system can be connected to the output of a power stage and comprises: a comparator that measures an output current ($I_{OUT}$) of the power stage; a control device that measures a voltage ($V_{DC}$) of the power stage; a test generator that comprises pairs of voltage-current values ($V_{DC}$-$I_{REF}$) that relate voltage values with current values of the power stage, where the test generator receives the measured voltage value from the control device and sends the corresponding current value from the pairs of voltage-current values to the comparator, which halts the power stage if the output current of the power stage is higher than or equal to the value of the current associated with the measured voltage.

8 Claims, 4 Drawing Sheets

(56) References Cited

U.S. PATENT DOCUMENTS

| | | |
|---|---|---|
| 2012/0075891 A1 | 3/2012 | Zhang et al. |
| 2012/0195076 A1 | 8/2012 | Zhang et al. |
| 2013/0041554 A1 | 2/2013 | Trunk |
| 2014/0268459 A1* | 9/2014 | Robinson ............. H02H 3/0935 |
| | | 361/87 |

FOREIGN PATENT DOCUMENTS

| | | |
|---|---|---|
| WO | 2011085837 A2 | 7/2011 |
| WO | 2014070835 A2 | 5/2014 |

* cited by examiner

SYSTEM AND METHOD FOR DYNAMIC OVER-CURRENT PROTECTION FOR POWER CONVERTERS

CROSS-REFERENCE TO RELATED APPLICATIONS

This application is the United States national phase of International Application No. PCT/ES2018/070778 filed Dec. 4, 2018, and claims priority to Spanish Patent Application No. P201731435 filed Dec. 20, 2017, the disclosures of which are hereby incorporated by reference in their entirety.

FIELD OF THE INVENTION

The present invention relates to a system and a method for dynamic over-current protection for power converters.

The technical field of the invention is comprised in the field of power converters, motor controllers, and solar and wind power generation systems.

BACKGROUND OF THE INVENTION

All power converters have, as common elements, at least one DC voltage bus and one power converter bridge, formed by switching devices, the triggering of which is controlled so that the output voltage/intensity has the characteristics required by the application. Therefore, if the power converter is a solar inverter, the equipment will work as an AC current source having the same frequency as the network (typically 50/60 Hz). If the power converter is a variable speed drive, the power supply frequency will be modified so as to vary the rotational speed of three-phase asynchronous electric motors.

The power stage is formed by one or more power modules. Each power module is formed by at least one DC voltage bus and a series of switching devices. The simplest case (DC/DC converters) would be made up of a single switching device, whereas in variable speed drives or DC/AC converters, bridges formed by several switching devices (six if the power converter bridge has two levels) will be implemented. For power converters with an AC output, the power stage incorporates a filter required for adapting the output waveform to that of the motor. If the input of the equipment is an AC source, the power stage would further include a bridge rectifier which rectifies the polarity of the input AC voltage, such that it is stable. The rectifier can be formed by diodes or transistors. This second option incorporates capacity for moving electrical energy bidirectionally, allowing the discharge in the source of excess energy.

To ensure the correct operation of the power stage of the power converter, as well as to prevent damage from over-voltages or over-currents, the power converter incorporates protection devices connected to the power stage.

The protection required for the power converter is mainly determined by the characteristics of the switching devices.

Currently, the protection incorporated in power converters is hardware-type protection. The protection system consists of setting a protective current threshold, such that once said threshold is exceeded, the control of the power converter orders a halt, in this manner preventing damage in the switching devices.

This threshold is calculated by taking into account that, when the switching device is halted, a voltage peak is produced due to the associated leakage inductances. This voltage peak is determined by the energy stored in these leakage inductances and by the capacitance of the switching device itself and of its parasitic elements. The failure detection threshold is determined based on the maximum voltage that the terminals of the switching device can support at the opening thereof when the protective current circulates through it.

The hardware protection system uses a reference current less than or equal to the maximum current to ensure protection. In the current state of the art, the reference current is fixed, i.e., it has a constant value and the value thereof is established depending on the voltage of the DC bus.

The main drawback of this mode of operation is that the maximum power is fixed and determined by the value of the defined reference current indicated above for carrying out the comparison. Therefore, if increasing the range of use in voltage of a power converter is desired, i.e., if gradually approaching the electrical limit (maximum voltage) thereof is desired, it is not possible to set the protections at the same level as the one mentioned above, given that, in the event of a short-circuit, the protection would halt the power stage. Furthermore, the voltage peak produced during the halt would destroy the switching devices. For this reason, the set protection value is delimited by the maximum voltage ($V_{DC}$=voltage of the DC bus) of the power stage. As mentioned, this value can vary over time, but it is considered a maximum and fixed value for calculating the protection.

Static protection circuits of the state of the art are, for example, the circuit disclosed in European patent application with publication number EP2800260A1 which discloses a semiconductor protection circuit connected in parallel to a converter.

It would therefore be desirable to have an over-current protection system which, in addition to protecting the power converter, allows the power of the converter (the performance thereof) to be increased to the maximum operating limit, i.e., to the maximum $V_{DC}$ value of the power converter.

SUMMARY OF THE INVENTION

A first aspect of the invention discloses a dynamic over-current protection system for power converters. The dynamic over-current protection system for power converters can be connected to the output of the power stage comprised in the power converter. The over-current protection system for power converters of the present invention comprises:

a comparator that can be connected to the output of the power stage, measuring an output current ($I_{OUT}$) of the power stage;

a control device that is connected with the comparator and can be connected with the power stage, wherein the control device measures a voltage ($V_{DC}$) of the power stage;

a test generator connected with the control device and with the comparator, wherein the test generator comprises pairs of voltage-current values ($V_{DC}$-$I_{REF}$) that relate voltage values ($V_{DC}$) of the power stage with current values between zero and a pre-established current limit ($I_{RMS}$);

such that the test generator receives from the control device the measured voltage value ($V_{DC}$) and sends the corresponding current value ($I_{REF}$) of the pairs of voltage-current values to the comparator, which halts the power stage if the output current ($I_{OUT}$) of the power stage is higher than or equal to the current value ($I_{REF}$) associated with the measured voltage ($V_{DC}$).

The power stage comprises a DC bus and a power converter circuit. The power converter circuit comprises at least one switching device (for example, insulated-gate bipolar transistors (IGBTs)).

The switching device has an equivalent circuit formed by at least one capacitor, a coil, and a switch.

The pairs of voltage-current values ($V_{DC}$-$I_{REF}$) are calculated by applying Eq. 2 on the equivalent circuit.

The test generator comprises the pairs of voltage-current values ($V_{DC}$-$I_{REF}$), wherein the pairs of voltage-current values ($V_{DC}$-$I_{REF}$) are calculated by means of:

$$I_{REF} \leq I_{max} = \sqrt{\frac{C}{L}} (V_{max}^2 - V_{DC}^2) \quad \text{(Eq. 2)}$$

wherein:

$V_{DC}$: is the DC voltage of the power stage, which may vary over time;

$V_{max}$: the maximum voltage the terminals of the switching device can support at the opening thereof when the protective current circulates through it.

L: leakage inductance of the switching device;

C: capacity of the parasitic elements of the switching device.

In one embodiment, the control device comprises at least one voltage meter for measuring the DC voltage ($V_{DC}$) of the power stage.

In another embodiment, the control device additionally comprises a processor and a memory for storing and processing control setpoints which modify the voltage value ($V_{DC}$) of the power stage. The control device receives from the comparator the value of the output current ($I_{OUT}$) of the power stage, the voltage of the power stage ($V_{DC}$), and the value of the reference current ($I_{REF}$) it stores in the memory. The control device can calculate, based on the three preceding values ($V_{DC}$, $I_{OUT}$, $I_{REF}$), new values of the DC voltage ($V_{DC}$) which it sends (by means of setpoints) to the power stage such that the power stage increases the power thereof (by means of increasing the voltage $V_{DC}$) to the maximum available power of the power stage depending on the source to which the power stage is connected. The gradual increase in the value of the voltage ($V_{DC}$) involves an increase in the output current of the power stage ($I_{OUT}$) which the protection device allows until the value of the output current is less than or equal to the reference current value ($I_{REF}$) dynamically calculated by the test generator.

In one embodiment, the pre-established current limit ($I_{RMS}$) corresponds with the current limit of the switching devices comprised in the power stage. The transistors comprised in the power stage are usually the elements limiting the current thereof. Therefore, the transistors (switching devices) will determine the maximum current value ($I_{RMS}$).

A second aspect of the invention discloses a power converter comprising the dynamic protection system according to the first aspect of the invention and for any of the embodiments thereof.

A third aspect of the invention discloses a dynamic over-current protection method for power converters. The dynamic over-current protection method for power converters comprises the following steps of:

generating pairs of voltage-current values ($V_{DC}$-$I_{REF}$) that relate voltage values ($V_{DC}$) of the power stage with current values between zero and a current limit ($I_{RMS}$) of switching devices comprised in the power stage;

measuring the DC voltage ($V_{DC}$) and the output current ($I_{OUT}$) of the power stage;

comparing the value of the output current ($I_{OUT}$) with the current value ($I_{REF}$) corresponding to the measured voltage ($V_{DC}$) in the pairs of voltage-current values ($V_{DC}$-$I_{REF}$);

halting the power converter if the value of the output current ($I_{OUT}$) is higher than or equal to the current value ($I_{REF}$) corresponding to the measured voltage ($V_{DC}$) in the pairs of voltage-current values ($V_{DC}$-$I_{REF}$).

In one embodiment, the dynamic over-current protection method for power converters additionally comprises increasing the DC voltage ($V_{DC}$) of the power stage until meeting the condition of the value of the output current ($I_{OUT}$) being smaller by a pre-established value than the current value ($I_{REF}$) corresponding to the measured voltage ($V_{DC}$) in the pairs of voltage-current values ($V_{DC}$-$I_{REF}$). A user is free to choose a pre-established value that is as small as they wish, such that the output current ($I_{OUT}$) approaches that of the reference current ($I_{REF}$) without actually having the same value.

DETAILED DESCRIPTION OF THE INVENTION

An embodiment of the invention is described below in an illustrative and non-limiting manner.

Figure 1:
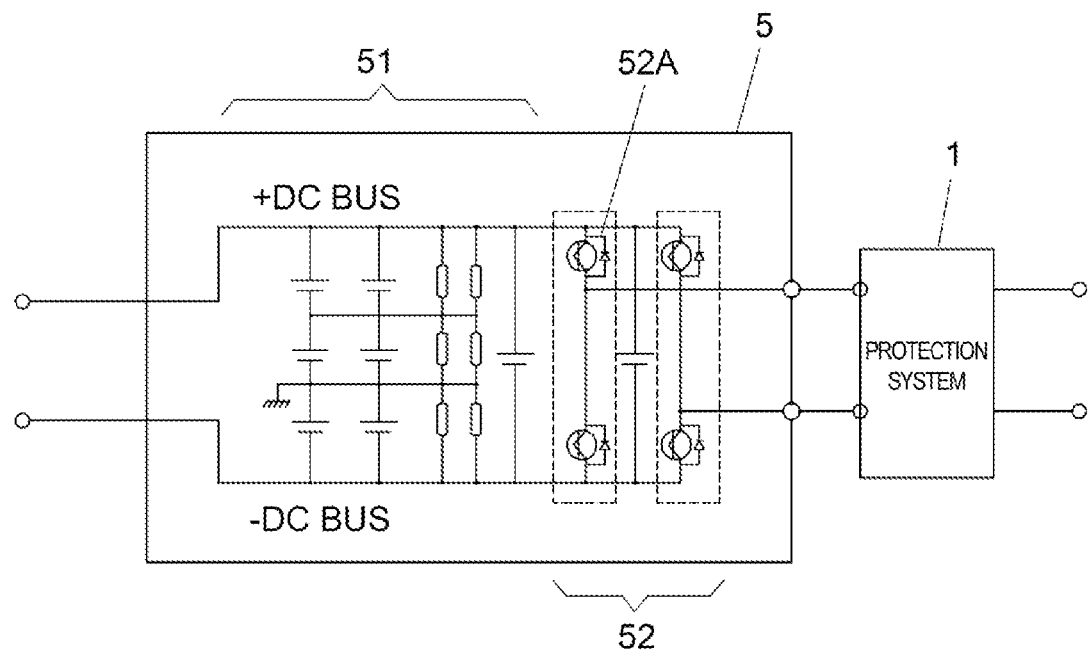
FIG. 1 shows a circuit of the power stage of a power converter with an over-voltage protection system connected to the output thereof.

FIG. 1 shows a power stage 5 of the state of the art comprised in a power converter. The power stage 5 comprises the DC bus 51 and the power converter circuit 52. The power converter circuit 52 is mainly formed by switching devices 52A. An energy source (not shown) is connected to the input of the power stage. A protection device 1 is connected to the output of the power stage.

Figure 2:
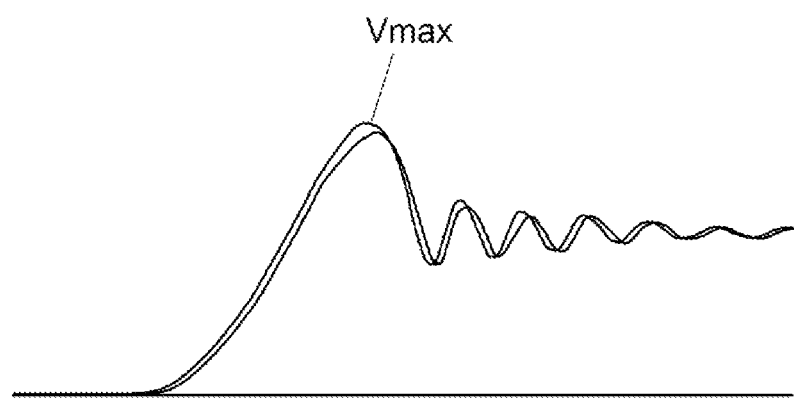
FIG. 2 shows the voltage peak produced in the terminals of a switching device (IGBT transistor) when the switching device is halted.

FIG. 2 shows the voltage peak $V_{MAX}$ produced in the terminals of a switching device (for example, switching device 52A) when the switching device is halted. The voltage peak is necessarily taken into account for setting a current threshold whereby the protection system protects the power converter in the event of over-voltage or over-current situations.

Figure 3:
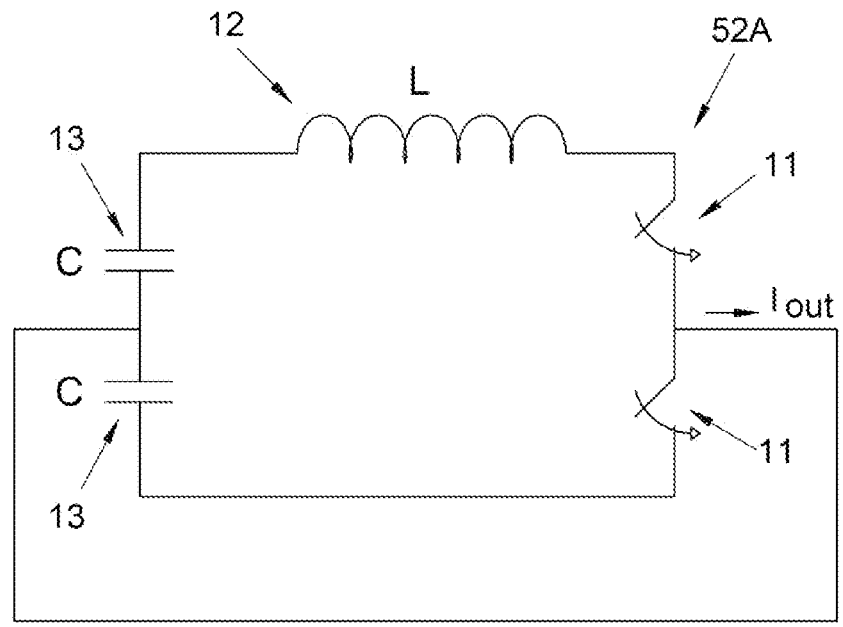
FIG. 3 shows the equivalent circuit of a switching device.

FIG. 3 shows the equivalent circuit of a switching device 52A. The switching device limits the performance of the power stage. The equivalent circuit shown in FIG. 3 comprises two capacitors 13, two switches 11, and an inductor 12. To be able to calculate the protective current threshold, the voltage peak of the switching device at the moment said device comes to a halt must be known. The voltage peak Vmax (FIG. 2) is determined by the energy stored in the leakage inductances (L) and by the capacitance of the switching device itself and of its parasitic elements (C), such that the following energy balance is verified:

$$\tfrac{1}{2}LI_{max}^2 = \tfrac{1}{2}C(V_{max}^2 - V_{DC}^2) \qquad \text{(Eq.1)}$$

wherein V is the DC voltage of the power stage, which may vary over time. The failure detection threshold ($I_{max}$) is determined based on the maximum voltage ($V_{max}$) the terminals of the switching device can support at the opening thereof when the protective current circulates through it.

$$I_{REF} \le I_{max} = \sqrt{\tfrac{C}{L}}(V_{max}^2 - V_{DC}^2) \qquad \text{(Eq. 2)}$$

Figure 6:
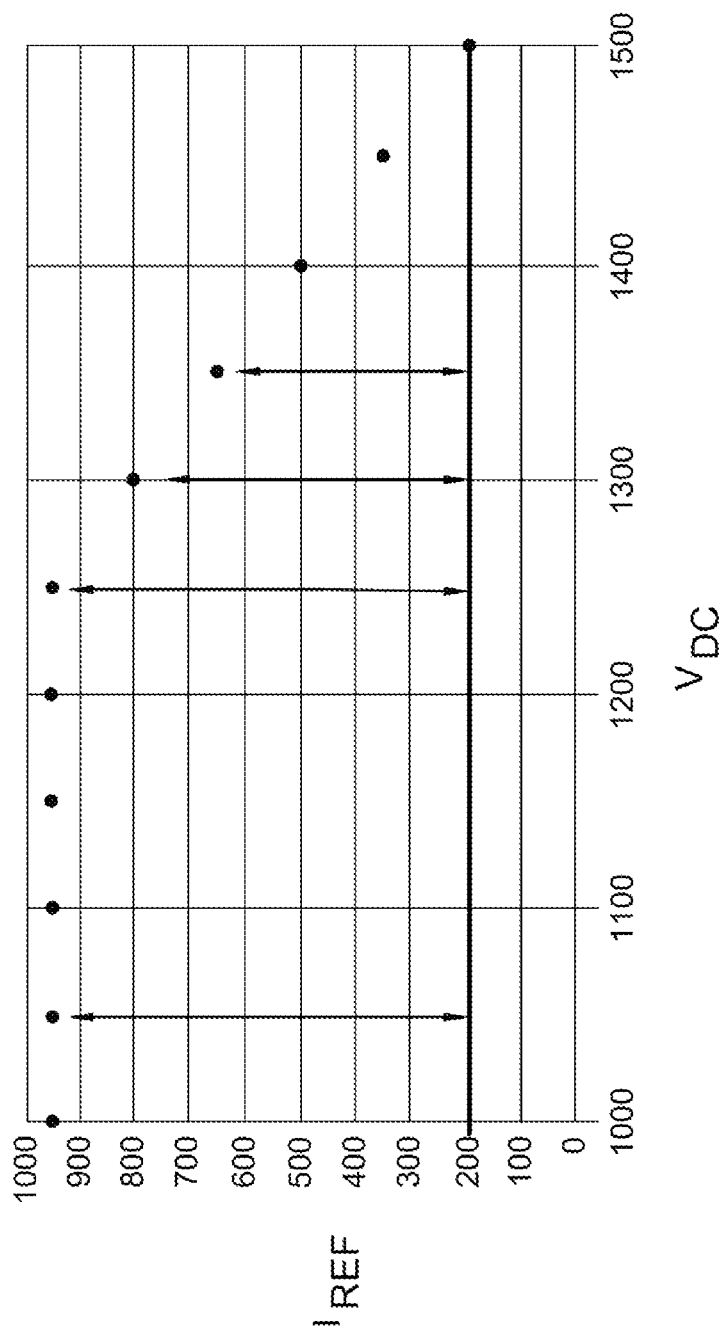
FIG. 6 shows the reference current (level of protection) calculated according to the present invention with respect to the voltage ($V_{DC}$) of the power stage.

The hardware protection system uses a reference current ($I_{REF}$) less than or equal to the maximum current ($I_{MAX}$) to ensure protection. In the current state of the art, the reference current ($I_{REF}$) is fixed, i.e., it has a constant value. In FIG. 6, the constant $I_{REF}$ according to the state of the art would have the value of 200 Amperes.

Figure 4:
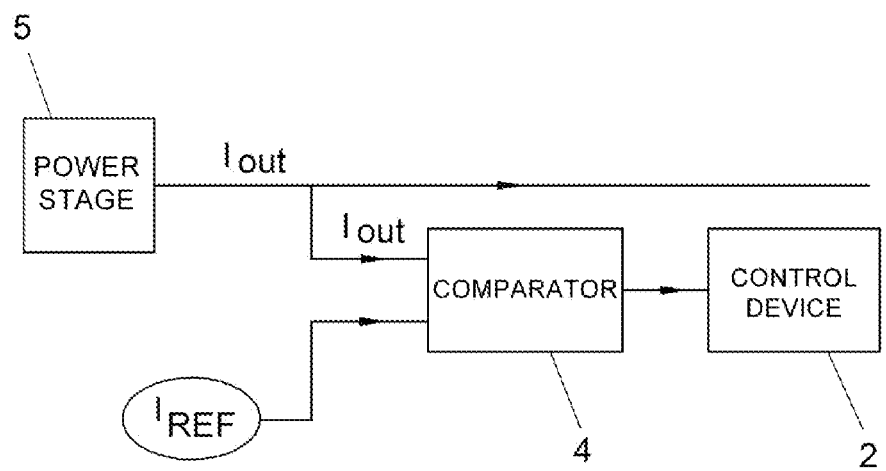
FIG. 4 shows an over-voltage protection system of the state of the art.

Taking into account the foregoing, FIG. 4 shows an over-current protection system of the state of the art. The protection system is made up of a comparator 4 with two inputs and one output. The output is connected to a control device 2, one input is connected to the output of the power stage 5 for measuring the output current of the power stage, and the other input receives the reference current value for suitably protecting the power stage. With this configuration, the comparator compares the current value at the output of the power stage 5 and the reference current value $I_{REF}$. The comparator sends the result of the comparison to the control device 2. The control device 2 halts the power stage, and accordingly the power converter when the current value at the output of the power stage $I_{OUT}$ is higher than or equal to the reference current value $I_{REF}$.

Figure 5:
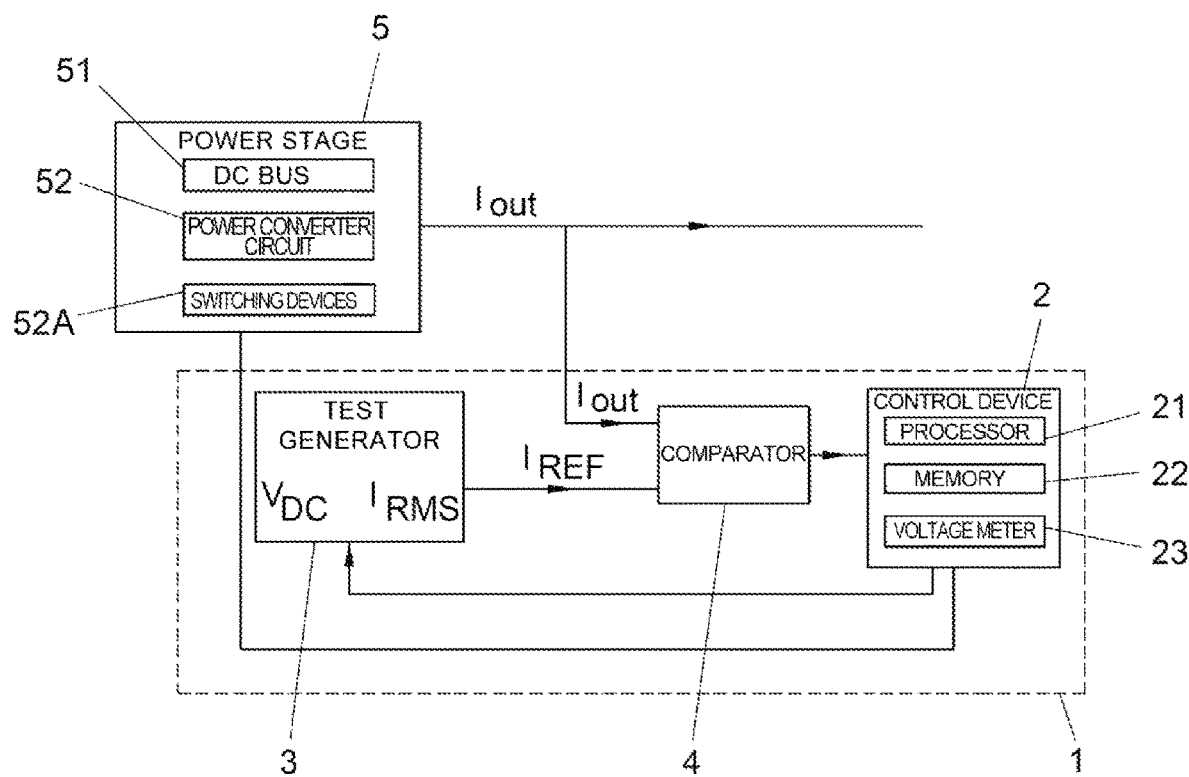
FIG. 5 shows an over-voltage protection system according to the present invention.

FIG. 5 shows the protection system 1 of the present invention which is made up of a control device 2, a test generator 3, and a comparator 4. The control device comprises a processor 21, a memory 22, and a voltage meter 23 connected to the DC bus 51 of the power stage 5. The comparator 4 has two inputs and one output. The output is connected to the control device 2, one input is connected to the output of the power stage 5 for measuring the output current $I_{OUT}$ of the power stage, and the other input receives the reference current value $I_{REF}$ for suitably protecting the power stage. With this configuration, the comparator 4 compares the current value $I_{OUT}$ at the output of the power stage 5 and the reference current value $I_{REF}$. The comparator sends the result of the comparison to the control device and also the values of the output current $I_{OUT}$ and reference current $I_{REF}$. The control device 2 halts the power stage 5 if the current value $I_{OUT}$ at the output of the power stage 5 is higher than or equal to the reference current value $I_{REF}$. Unlike the state of the art, the value of $I_{REF}$ calculated by the test generator 3 is a function of the DC voltage (voltage in the DC bus, FIG. 1) measured in the power stage 5 and of the rated current $I_{RMS}$ of the switching device. The current limitation of the power stage 5 is determined by the maximum current the switching devices ($I_{RMS}$) can support. The test generator 3 has pairs of associated values V-I ($V_{DC}$, I) that relate, for all the possible current values between zero and the current limit ($I_{RMS}$) of the switching devices, with the possible voltage $V_{DC}$ of the power stage (see FIG. 6).

The pairs of values V-I are calculated by applying the equation Eq. 2 described above. Once the pairs of values V-I have been calculated, the test generator 3 is capable of calculating the current value $I_{REF}$ for the voltage value $V_{DC}$ measured in the power stage, thereby preventing the risk of over-currents. This is because the current value at the output of the test generator ($I_{REF}$) is always less than or equal to the current limit ($I_{RMS}$) of the switching device. As shown in FIG. 6, by means of the present invention, the current ($I_{OUT}$) at the output of the power stage 5 can be increased, which would increase the power of the power stage, maintaining the protection of the power stage. Taking the values of FIG. 6 as reference, according to the state of the art, the power stage could never supply output current values ($I_{OUT}$) greater than 200 Amperes because the protection device according to the state of the art would not allow it. In contrast, with the protection device of the present invention, it would be possible, for example, to increase the output current ($I_{OUT}$) to 950 Amperes for voltage values ($V_{DC}$) between 1000 Volts and 1250 Volts.

The control device 2 performs several functions. One function is to protect the power converter, like it does conventionally. Another function is to measure the voltage in the DC bus to provide the voltage value to the test generator. The control device 2 may also optionally comprise a user interface (not shown) whereby a user can enter the maximum current value ($I_{RMS}$) of the switching devices and the values of the pairs of values V-I, wherein all the values ($I_{RMS}$, V-I) are then sent to the test generator. Optionally, the test generator may comprise a user interface whereby a user can enter the maximum current value ($I_{RMS}$) of the switching devices and the values of the pairs of values V-I.

Additionally and independently, the control device 2, by means of the control setpoints sent to the power stage, is capable of gradually increasing the voltage of the power stage, and therefore, the power of the power stage (power of the power converter), also adjusting the value of the protective current, $I_{REF}$. It should be remembered that the power $S_{OUT}$ at the output of the power stage is defined as:

$$S_{OUT} = \sqrt{3} \times U_{AC} \times I_{RMS} \qquad \text{(Eq. 3)}$$

An example of how the control device 2 increased the potential $V_{DC}$ and reduces the protective current $I_{REF}$ is shown in FIG. 6. The control device 2 is capable of increasing the power by increasing the values of $V_{DC}$ to 1250 $V_{DC}$ while maintaining the current value $I_{REF}$, and decreasing the value of $I_{REF}$ to 1500 $V_{DC}$, this being the voltage limit for the power stage 5, and so that the reference current $I_{REF}$ is equal to the current $I_{RMS}$. In other words, in the state of the art the protective current $I_{REF}$ (200) is calculated as if the power stage always has a voltage of 1500 V, point at which the reference current $I_{REF}$ coincides with the current $I_{RMS}$. In contrast, by means of the present invention, the reference current $I_{REF}$ is calculated from the maximum current that the switching devices (therefore also the power stage 5) can support for each voltage value in which the power stage 5 operates. The relation ($V_{DC}$, $I_{REF}$) shown in FIG. 6 can be not only discrete points, but also a continuous graph, table containing pairs of values, and any other type of relationship wherein $I_{REF}(t) = f(V_{DC}(t))$ is true.

The invention claimed is:

1. A dynamic over-current protection system for power converters, wherein the dynamic over-current protection system is connectable to the output of a power stage comprised in the power converter; wherein the dynamic over-current protection system comprises:

a comparator, which is connectable to the output of the power stage, that measures an output current "$I_{OUT}$" of the power stage;

a control device that is connected with the comparator and that is connectable to the power stage, wherein the control device measures a voltage "$V_{DC}$" of the power stage;

a test generator connected with the control device and with the comparator, wherein the test generator comprises pairs of voltage-current values "$V_{DC}$-$I_{REF}$" that relate voltage values "$V_{DC}$" of the power stage with current values between zero and a pre-established current limit "$I_{RMS}$";

wherein the test generator receives from the control device the measured voltage value "$V_{DC}$" and sends the corresponding current value "$I_{REF}$" of the pairs of voltage-current values to the comparator, which halts the power stage if the output current "$I_{OUT}$" of the power stage is higher than or equal to the current value "$I_{REF}$" associated with the measured voltage "$V_{DC}$";

wherein the power stage comprises a DC bus and a power converter circuit, and wherein the power converter circuit comprises at least one switching device;

wherein the pairs of voltage-current values "$V_{DC}$-$I_{REF}$" are calculated by means of:

$$I_{REF} \le I_{max} = \sqrt{\frac{C}{L}} (V_{max}^2 - V_{DC}^2) \qquad \text{(Eq. 2)}$$

wherein:

$V_{DC}$: is the DC voltage of the power stage, which may vary over time;

$V_{max}$: the maximum voltage the terminals of the switching device can support at the opening thereof when the protective current circulates through it;

L: leakage inductance of the switching device;

C: capacity of the parasitic elements of the switching device.

2. The dynamic over-current protection system according to claim 1, wherein the switching device has an equivalent circuit formed by at least one capacitor, a coil, and a switch.

3. The dynamic over-current protection system according to claim 1, wherein the control device comprises at least one voltage meter for measuring the DC voltage "$V_{DC}$" of the power stage.

4. The dynamic over-current protection system according to claim 1, wherein the control device additionally comprises a processor and a memory for storing and processing control setpoints which modify the voltage value "$V_{DC}$" of the power stage.

5. The dynamic over-current protection system according to claim 1, wherein the pre-established current limit "$I_{RMS}$" corresponds with the current limit of the switching devices comprised in the power stage.

6. A power converter comprising the dynamic over-current protection system of claim 1.

7. A dynamic over-current protection method for power converters, comprising:

generating pairs of voltage-current values "$V_{DC}$-$I_{REF}$" that relate voltage values "$V_{DC}$" of the power stage with current values between zero and a current limit "$I_{RMS}$" of switching devices comprised in the power stage according to the following equation:

$$I_{REF} \le I_{max} = \sqrt{\frac{C}{L}} (V_{max}^2 - V_{DC}^2)$$

wherein:

$V_{DC}$: is the DC voltage of the power stage, which may vary over time;

$V_{max}$: the maximum voltage the terminals of the switching device can support at the opening thereof when the protective current circulates through it;

L: leakage inductance of the switching device;

C: capacity of the parasitic elements of the switching device;

measuring the DC voltage "$V_{DC}$" and the output current "$I_{OUT}$" of the power stage;

comparing the value of the output current "$I_{OUT}$" with the current value "$I_{REF}$" corresponding to the measured voltage "$V_{DC}$" in the pairs of voltage-current values "$V_{DC}$-$I_{REF}$"; and halting the power converter if the value of the output current "$I_{OUT}$" is higher than or equal to the current value "$I_{REF}$" corresponding to the measured voltage "$V_{DC}$" in the pairs of voltage-current values "$V_{DC}$-$I_{REF}$".

8. The dynamic over-current protection method for power converters according to claim 7, wherein the method additionally comprises increasing the DC voltage "$V_{DC}$" of the power stage until meeting the condition of the value of the output current "$I_{OUT}$" being smaller by a pre-established value than the current value "$I_{REF}$" corresponding to the measured voltage "$V_{DC}$" in the pairs of voltage-current values "$V_{DC}$-$I_{REF}$".

* * * * *